(12) United States Patent
Seo et al.

(10) Patent No.: US 8,978,976 B2
(45) Date of Patent: Mar. 17, 2015

(54) ELECTRONIC IDENTIFICATION CARD INCLUDING A DISPLAY DEVICE, AND METHOD OF CHECKING COUNTERFEIT/ALTERATION OF AN ELECTRONIC IDENTIFICATION CARD

(71) Applicants: Hae-Kwan Seo, Yongin (KR); Bon-Seog Gu, Yongin (KR)

(72) Inventors: Hae-Kwan Seo, Yongin (KR); Bon-Seog Gu, Yongin (KR)

(73) Assignee: Samsung Display Co., Ltd., Yongin, Gyunggi-Do (KR)

( * ) Notice: Subject to any disclaimer, the term of this patent is extended or adjusted under 35 U.S.C. 154(b) by 98 days.

(21) Appl. No.: 13/713,329

(22) Filed: Dec. 13, 2012

(65) Prior Publication Data

US 2013/0341394 A1 Dec. 26, 2013

(30) Foreign Application Priority Data

Jun. 26, 2012 (KR) .................. 10-2012-0068290

(51) Int. Cl.
*G06K 5/00* (2006.01)
*G06K 19/06* (2006.01)
*G07F 7/08* (2006.01)
*G07F 7/10* (2006.01)
*G07C 9/00* (2006.01)

(52) U.S. Cl.
CPC ........ *G06K 19/06112* (2013.01); *G07F 7/0846* (2013.01); *G07F 7/1008* (2013.01); *G06K 5/00* (2013.01); *G07C 9/00079* (2013.01); *G07C 9/00087* (2013.01)
USPC .......................................... 235/380; 235/382

(58) Field of Classification Search
USPC .................. 235/380, 375, 382, 492
See application file for complete search history.

(56) References Cited

U.S. PATENT DOCUMENTS

| | | | |
|---|---|---|---|
| 7,946,501 B2 * | 5/2011 | Borracci | 235/492 |
| 2003/0116630 A1 | 6/2003 | Carey et al. | |
| 2005/0150947 A1 * | 7/2005 | Goodman et al. | 235/380 |
| 2005/0240528 A1 | 10/2005 | Hendrick | |
| 2010/0224687 A1 * | 9/2010 | Hiroyoshi | 235/494 |

FOREIGN PATENT DOCUMENTS

| | | |
|---|---|---|
| DE | 10-2007-000-885 A1 | 5/2009 |
| KR | 10 2007-0059008 A | 6/2007 |
| WO | WO 2009/062892 | 5/2009 |

* cited by examiner

*Primary Examiner* — Ahshik Kim
(74) *Attorney, Agent, or Firm* — Lee & Morse, P.C.

(57) ABSTRACT

An electronic identification card includes a display device. The display device includes a first memory region configured to store image data about a card holder of the electronic identification card, a second memory region configured to store unique pattern data about a unique pattern that is unique to the electronic identification card, and a display panel configured to display an image of the card holder based on the image data stored in the first memory region, and configured to display the unique pattern based on the unique pattern data stored in the second memory region.

19 Claims, 9 Drawing Sheets

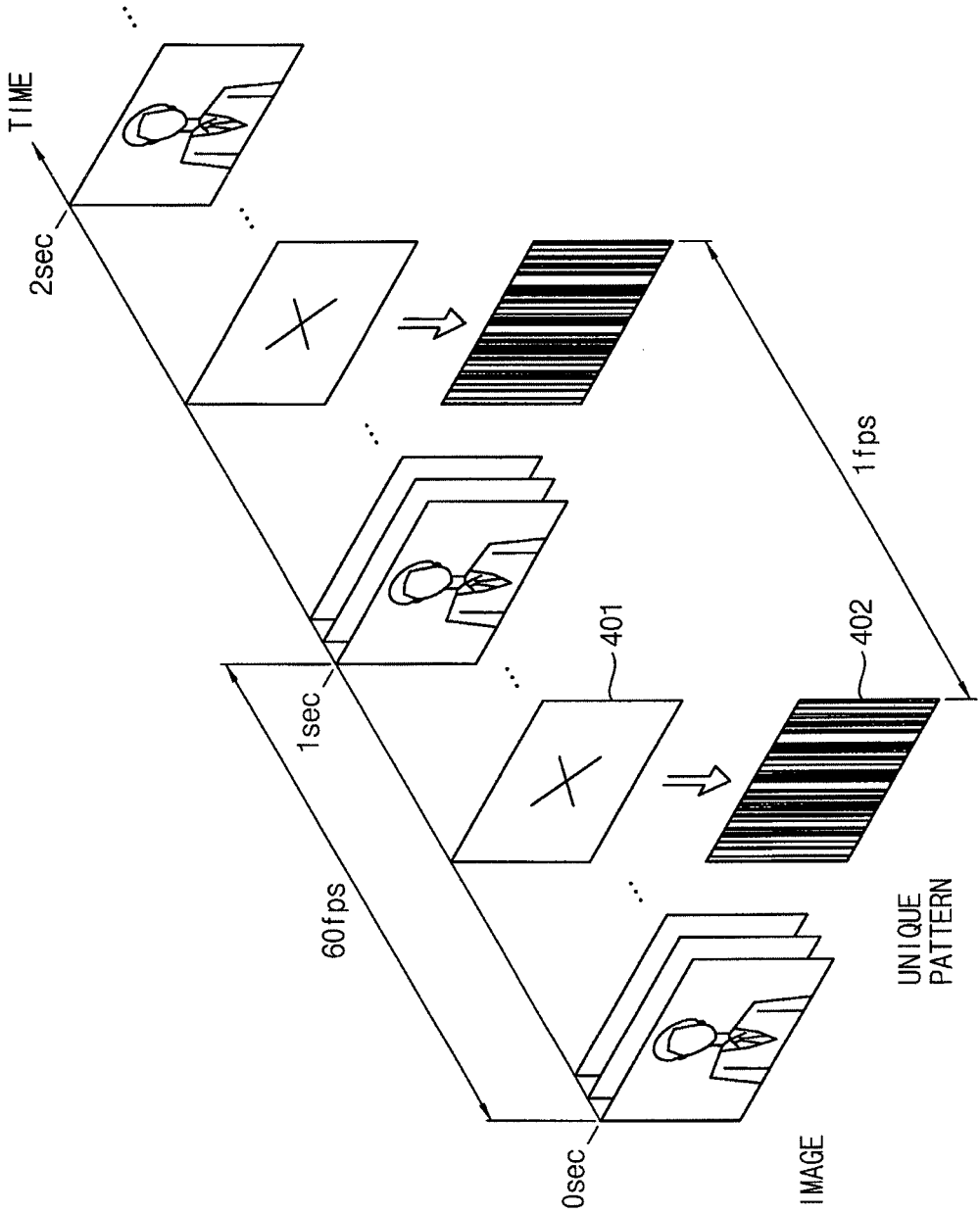

| VP | VP | VP | VP | VP | VP | VP | VP |
|----|----|----|----|----|----|----|----|
| VP | VP | VP | VP | VP | VP | VP | VP |
| VP | VP | VP | VP | VP | VP | VP | VP |
| VP | VP | VP | VP | VP | VP | VP | VP |
| VP | VP | VP | VP | VP | VP | VP | VP |
| VP | VP | VP | VP | VP | VP | VP | VP |
| VP | VP | VP | VP | VP | VP | VP | VP |
| VP | VP | VP | VP | VP | VP | VP | VP |

| VP | VP  | VP | VP  | VP | VP  | VP | VP  |
|----|-----|----|-----|----|-----|----|-----|
| VP | NVP | VP | NVP | VP | NVP | VP | NVP |
| VP | VP  | VP | VP  | VP | VP  | VP | VP  |
| VP | NVP | VP | NVP | VP | NVP | VP | NVP |
| VP | VP  | VP | VP  | VP | VP  | VP | VP  |
| VP | NVP | VP | NVP | VP | NVP | VP | NVP |
| VP | VP  | VP | VP  | VP | VP  | VP | VP  |
| VP | NVP | VP | NVP | VP | NVP | VP | NVP |

| VP | VP | VP | VP | VP | VP | VP | VP |
|----|----|----|----|----|----|----|----|
| VP | V+NVP | VP | V+NVP | VP | V+NVP | VP | V+NVP |
| VP | VP | VP | VP | VP | VP | VP | VP |
| VP | V+NVP | VP | V+NVP | VP | V+NVP | VP | V+NVP |
| VP | VP | VP | VP | VP | VP | VP | VP |
| VP | V+NVP | VP | V+NVP | VP | V+NVP | VP | V+NVP |
| VP | VP | VP | VP | VP | VP | VP | VP |
| VP | V+NVP | VP | V+NVP | VP | V+NVP | VP | V+NVP |

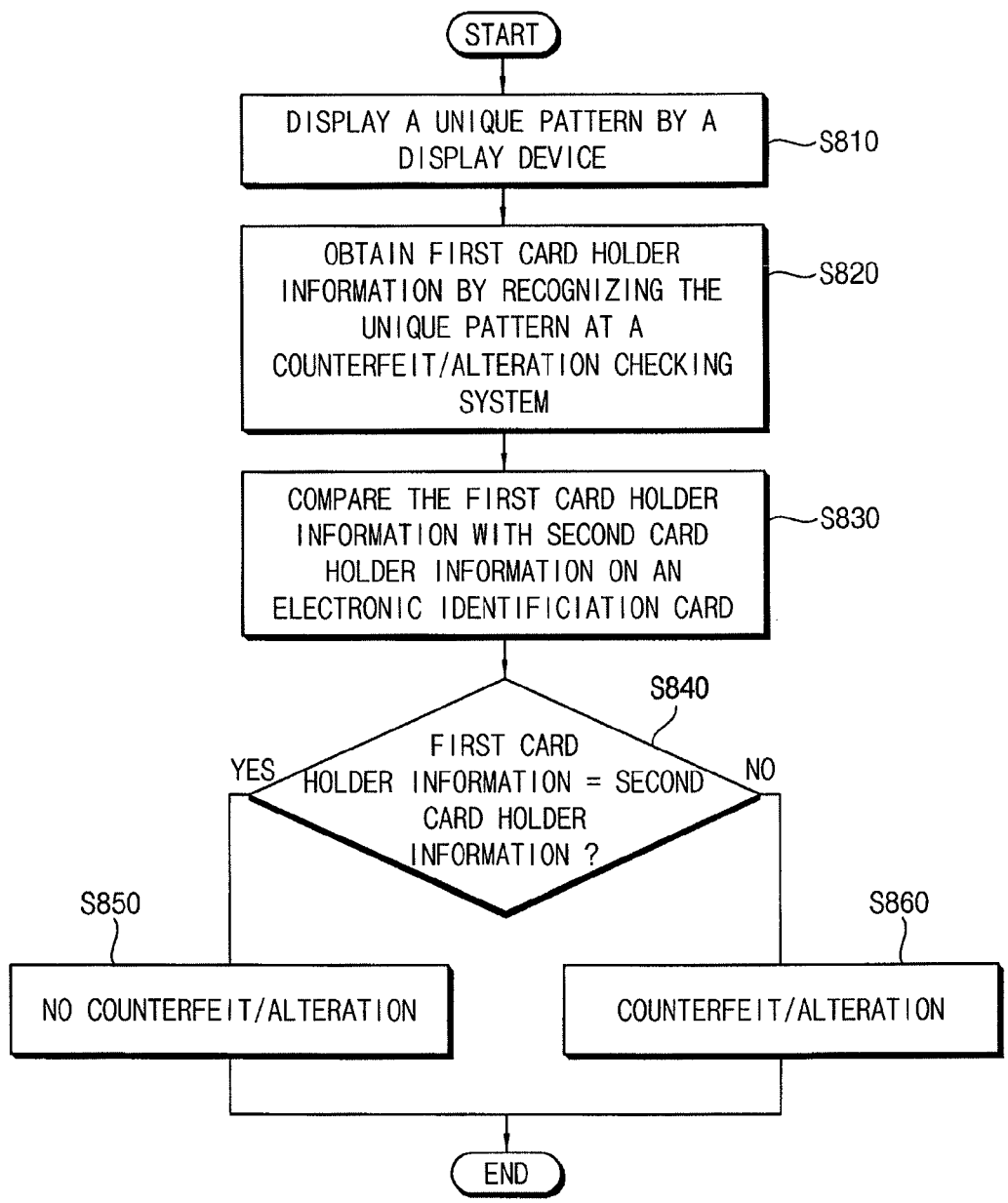

ELECTRONIC IDENTIFICATION CARD INCLUDING A DISPLAY DEVICE, AND METHOD OF CHECKING COUNTERFEIT/ALTERATION OF AN ELECTRONIC IDENTIFICATION CARD

CROSS REFERENCE TO RELATED APPLICATION

This application claims priority under 35 U.S.C. §119 to Korean Patent Application No. 2012-0068290 filed on Jun. 26, 2012, the disclosure of which is hereby incorporated by reference herein in its entirety.

BACKGROUND

1. Technical Field

Example embodiments of the inventive concept relate to electronic identification cards. More particularly, example embodiments of the inventive concept relate to electronic identification cards including display devices and methods of checking counterfeits/alterations of the electronic identification cards.

2. Description of the Related Art

Recently, an identification card, such as a passport, a resident card, a driver's license card, etc., where a picture of a card holder is attached or printed is being replaced with an electronic identification card that displays an image of the card holder using a display device. The electronic identification card including the display device may be forged, counterfeited or altered by changing image data stored in the display device and/or holder information printed on the electronic identification card. Accordingly, a security technique is required to check whether the electronic identification card is forged, counterfeited, or altered.

SUMMARY

Example embodiments provide an electronic identification card capable of checking whether the electronic identification card is forged, counterfeited or altered.

Example embodiments provide a method of checking counterfeit/alteration of an electronic identification card.

According to one aspect of example embodiments, there is provided an electronic identification card including a display device. The display device includes a first memory region configured to store image data about a card holder of the electronic identification card, a second memory region configured to store unique pattern data about a unique pattern that is unique to the electronic identification card, and a display panel configured to display an image of the card holder based on the image data stored in the first memory region and to display the unique pattern based on the unique pattern data stored in the second memory region.

In example embodiments, the second memory region may include a one-time programmable (OTP) memory region.

In example embodiments, the unique pattern may include a quick response (QR) code, a bar code, or a color code.

In example embodiments, a frame rate for displaying the unique pattern may be different from a frame rate for displaying the image of the card holder.

In example embodiments, the display device may be configured to display the unique pattern in response to a predetermined command.

In example embodiments, the predetermined command may include information about a frame rate for displaying the unique pattern, and the display device may be configured to display the unique pattern at the frame rate indicated by the predetermined command.

In example embodiments, the display panel may be configured to display the image of the card holder in a visible wavelength region, and may be configured to display the unique pattern in an invisible wavelength region.

In example embodiments, the display panel may include a plurality of visible pixels for displaying the image of the card holder, and a plurality of invisible pixels for displaying the unique pattern.

According to another aspect of example embodiments, there is provided an electronic identification card including a display device. The display device includes a plurality of pixels arranged in a matrix form. At least a portion of the plurality of pixels emit invisible light, and positions of the portion of the plurality of pixels correspond to a unique pattern that is unique to the electronic identification card.

In example embodiments, the portion of the plurality of pixels may include an organic light emitting diode having a material that emits the invisible light.

In example embodiments, the plurality of pixels except the portion of the plurality of pixels may include filters blocking the invisible light.

In example embodiments, the invisible light emitted by the portion of the plurality of pixels may be infrared light.

In example embodiments, the invisible light emitted by the portion of the plurality of pixels may be ultraviolet light.

According to still another aspect of example embodiments, there is provided a method of checking counterfeit/alteration of an electronic identification card including a display device. The display device displays a unique pattern that is unique to the electronic identification card, a counterfeit/alteration checking system obtains, first card holder information corresponding to the unique pattern by recognizing the unique pattern displayed by the display device, and, whether the electronic identification card is counterfeited or altered is determined by comparing the first card holder information with second card holder information on the electronic identification card.

In example embodiments, the unique pattern may be displayed based on unique pattern data stored in a one-time programmable (OTP) memory region of the display device.

In example embodiments, to display the unique pattern, the display panel may receive a predetermined command from the counterfeit/alteration checking system, and may display the unique pattern in response to the predetermined command.

In example embodiments, the predetermined command may include information about a frame rate for displaying the unique pattern, and the display device may be configured to display the unique pattern at the frame rate included in the predetermined command.

In example embodiments, the unique pattern may be displayed such that pixels having positions corresponding to the unique pattern emit invisible light.

In example embodiments, the pixels having the positions corresponding to the unique pattern may include an organic light emitting diode having a material that emits the invisible light.

In example embodiments, to check whether the electronic identification card is counterfeited or altered, it may be determined that the electronic identification card is neither counterfeited nor altered when the first card holder information is the same as the second card holder information, and it may be determined that the electronic identification card is counterfeited or altered when the first card holder information is different from the second card holder information.

BRIEF DESCRIPTION OF THE DRAWINGS

Example embodiments can be understood in more detail from the following description taken in conjunction with the accompanying drawings, in which:

FIG. 4 is a diagram for describing a frame rate of an image of a card holder and a frame rate of a unique pattern displayed at an electronic identification card including a display device in accordance with example embodiments;

FIG. 5A is a diagram illustrating an example of a display panel included in a display device in accordance with example embodiments;

FIG. 5B is a diagram illustrating another example of a display panel included in a display device in accordance with example embodiments;

FIG. 5C is a diagram illustrating still another example of a display panel included in a display device in accordance with example embodiments;

FIG. 9 is a flow chart illustrating a method of checking counterfeit/alteration of an electronic identification card in accordance with example embodiments.

DETAILED DESCRIPTION

Figure 1:
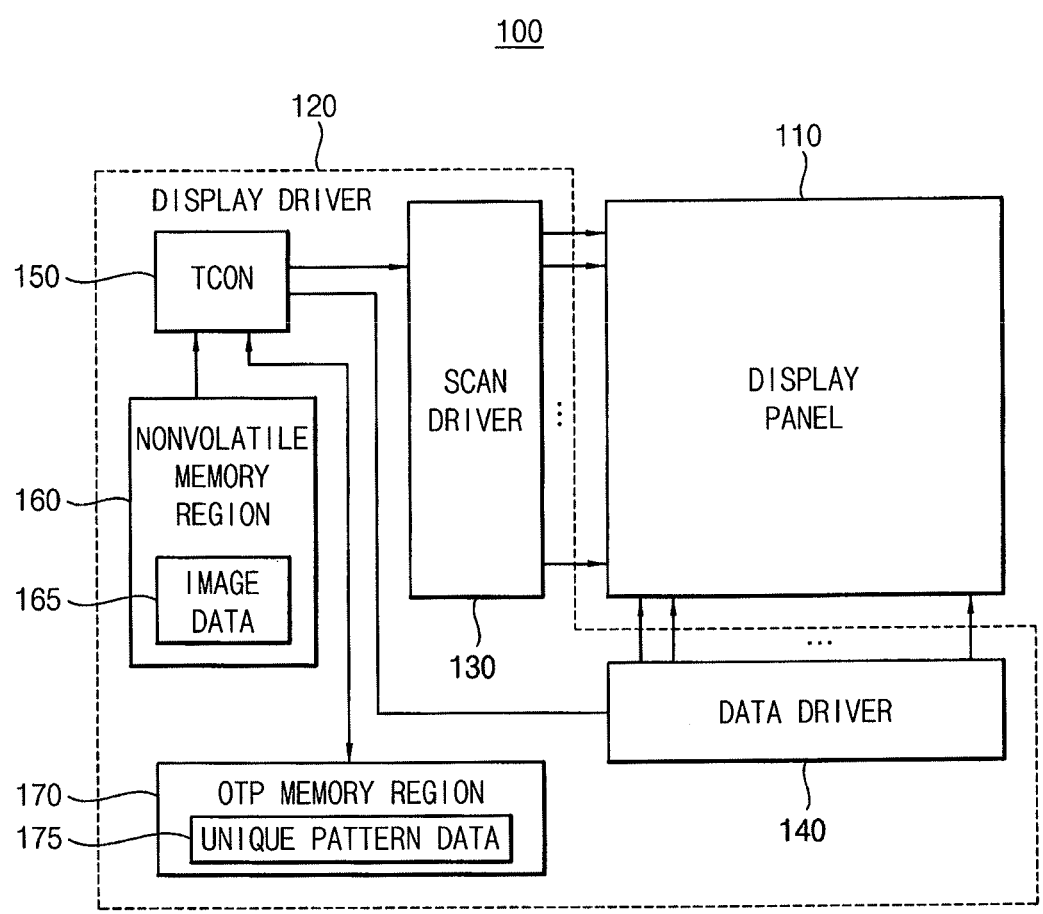
FIG. 1 is a block diagram illustrating a display device included in an electronic identification card in accordance with example embodiments.

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a display device 100 included in an electronic identification card in accordance with example embodiments. Referring to FIG. 1, the display device 100 included in an electronic identification card includes a display panel 110 and a display driver 120.

The display panel 110 may include a plurality of pixels arranged in a matrix. For example, the display panel 110 may be an organic light emitting display panel. In some example embodiments, the display panel 110 may include a plurality of visible pixels arranged in a matrix. For example, each visible pixel may be an RGB pixel including a red sub-pixel emitting red light, a green sub-pixel emitting green light, and a blue sub-pixel emitting blue light; a WOLED pixel including white sub-pixels emitting visible light and red, green, and blue filters formed on the white sub-pixels; an RGBW pixel including white sub-pixels on which the red, green, and blue filters are formed, and a white sub-pixel on which a color filter is not formed. In other example embodiments, the display panel 110 may include the plurality of visible pixels and a plurality of invisible pixels. The plurality of visible pixels may emit the visible light (e.g., red light, green light, blue light, and/or white light), and the plurality of invisible pixels may emit invisible light (e.g., infrared light or ultraviolet light). In some example embodiments, a resolution of the plurality of invisible pixels may be lower than a resolution of the plurality of visible pixels. In still other example embodiments, the display panel 110 may include the plurality of visible pixels arranged in a matrix, and at least a portion of the plurality of visible pixels may additionally include a material emitting the invisible light, i.e., to emit both invisible light and visible light.

The display driver 120 may include a scan driver 130, a data driver 140, a timing controller 150, a first memory region 160, and a second memory region 170. The scan driver 130 may be controlled by the timing controller 150 to turn on or off thin film transistors (TFTs) formed on the display panel 110. The data driver 140 may be controlled by the timing controller 150 to apply a data signal corresponding to an image to be displayed to the display panel 110.

The first memory region 160 may store image data 165 about a card holder of the electronic identification card. For example, the first memory region 160 may be implemented with a nonvolatile memory, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. According to example embodiments, the first memory region 160 may be located inside or outside the display driver 120.

The second memory region 170 may store unique pattern data 175 about a unique pattern that is unique to the electronic identification card. That is, different electronic identification cards may have different unique pattern data respectively corresponding to different unique patterns. In some example embodiments, the second memory region 170 may be a one-time programmable (OTP) memory region, such that the unique pattern data stored in the second memory region 170 cannot be modified or changed once the unique pattern data is written to the OTP memory region. For example, the second memory region 170 may be implemented with an electrically programmable fuse memory, a laser-programmable fuse memory, an anti-fuse memory, etc. According to example embodiments, the second memory region 170 may be located inside or outside the display driver 120.

The timing controller 150 may control the data driver 140 and the scan driver 130 to display an image of the card holder on the display panel 110 based on the image data 165 stored in the first memory region 160. Further, the timing controller 150 may control the data driver 140 and the scan driver 130 to display the unique pattern on the display panel 110 based on the unique pattern data 175 stored in the second memory region 170. For example, the timing controller 150 may control the data driver 140 and the scan driver 130 to display the image of the card holder by the display panel 110 during a relatively long time and to display the unique pattern by the display panel 110 during a relatively short time. In some example embodiments, the timing controller 150 may control the data driver 140 and the scan driver 130 to display the image of the card holder at a first frame rate and to display the unique pattern at a second frame rate different, e.g., lower, than the first frame rate. In other example embodiments, the timing controller 150 may control the data driver 140 and the scan driver 130 to display the unique pattern by the display panel 110 in response to a predetermined command provided from an external device or circuit. The display panel 110 may display the unique pattern at a predetermined frame rate or a frame rate indicated by the predetermined command.

As described above, the display device 100 included in the electronic identification card according to example embodiments may store the unique pattern data 175 in the second or OTP memory region 170 and may display the unique pattern that is unique to the electronic identification card based on the unique pattern data 175. Thus, even if the image of the card holder is counterfeited or altered by changing the image data 165 stored in the display device 100 or card holder information on the electronic identification card is counterfeited or altered, the unique pattern data 175 stored in the OTP memory region 170 cannot be changed. Accordingly, whether the electronic identification card is counterfeited or altered may be checked using the unique pattern that is unique to the electronic identification card.

Figure 2:
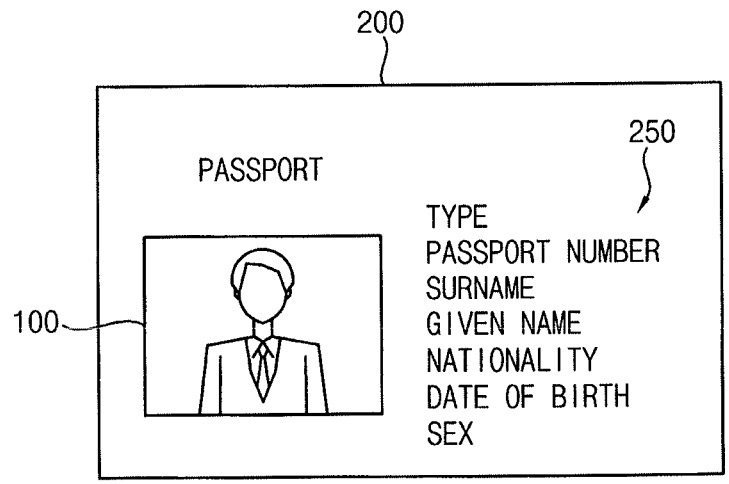
FIG. 2 is a diagram illustrating an example of an electronic identification card including a display device in accordance with example embodiments.

FIG. 2 is a diagram illustrating an example of an electronic identification card including a display device in accordance with example embodiments.

Referring to FIG. 2, unlike a conventional identification card where a picture of a card holder is attached or printed, an electronic identification card 200 includes the display device 100 displaying an image of the card holder. FIG. 2 illustrates an example of an electronic passport as the electronic identification card 200, according to example embodiments, the electronic identification card 200 may be any identification card, such as an electronic resident card, an electronic driver's license card, etc.

Card holder information 250 may be recorded (e.g., printed) on the electronic identification card 200. For example, in case of the electronic passport, the card holder information 250 on the electronic identification card 200 may include a type of a passport, a passport number, a surname of the card holder, a given name of the card holder, nationality of the card holder, a date of birth of the card holder, sex of the card holder, etc.

Figure 3A:
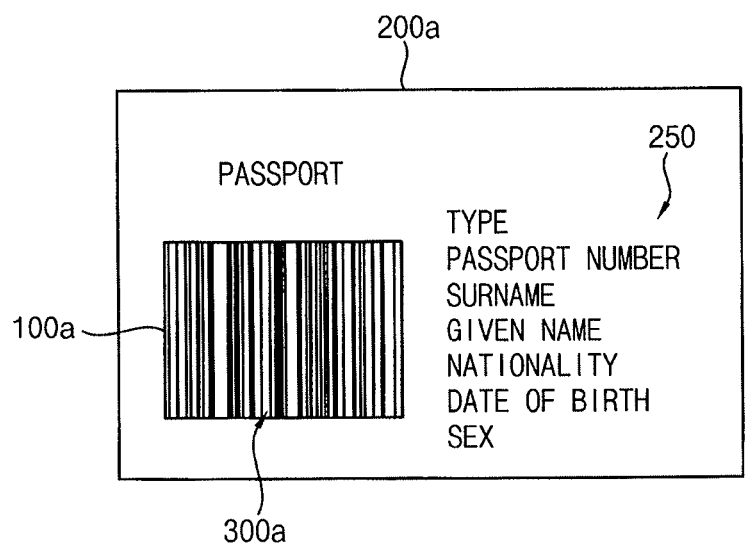
FIG. 3A is a diagram illustrating an example of a unique pattern displayed at an electronic identification card including a display device in accordance with example embodiments.
Figure 3B:
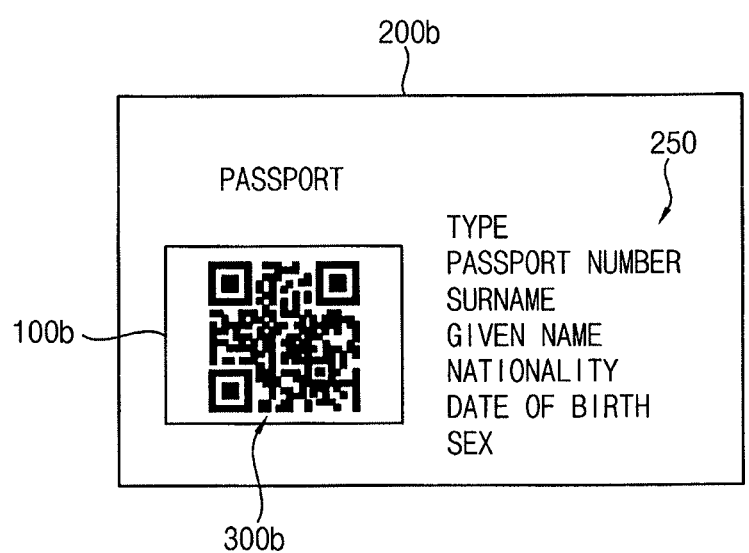
FIG. 3B is a diagram illustrating another example of a unique pattern displayed at an electronic identification card including a display device in accordance with example embodiments.

The display device 100 included in the electronic identification card 200 may mainly display an image of the card holder as illustrated in FIG. 2, and may display a unique pattern instead of or along with the image of the card holder periodically or in response to a predetermined command during a predetermined time as illustrated in FIG. 3A or FIG. 3B.

FIG. 3A is a diagram illustrating an example of a unique pattern displayed at an electronic identification card including a display device 100a in accordance with example embodiments. FIG. 3B is a diagram illustrating another example of a unique pattern displayed at an electronic identification card including a display device 110b in accordance with example embodiments.

Referring to FIG. 3A, the display device 100a included in an electronic identification card 200a may display a barcode 300a as a unique pattern based on unique pattern data stored in an one-time programmable memory region. The barcode 300a may be unique to the electronic identification card 200a, and may be used to check whether electronic identification card 200a is counterfeited or altered.

Referring to FIG. 3B, the display device 100b included in an electronic identification card 200b may display a quick response (QR) code 300b as a unique pattern based on unique pattern data stored in an one-time programmable memory region. The QR code 300b may be unique to the electronic identification card 200b, and may be used to check whether electronic identification card 200b is counterfeited or altered.

Although FIG. 3A illustrates an example of the barcode 300a as the unique pattern and FIG. 3B illustrates an example of the QR code 300b as the unique pattern, the unique pattern displayed by the display device 100a and 100b included in the electronic identification card 200a and 200b may be any image that is unique to the electronic identification card 200a and 200b. For example, the display device 100a and 100b may display the unique code in a form of a color code. In other example embodiments, the display device 100a and 100b included in the electronic identification card 200a and 200b may display the unique code in a form of hologram. The hologram may be unique to the electronic identification card 200a and 200b, and may be used to check whether electronic identification card 200a and 200b is counterfeited or altered.

FIG. 4 is a diagram for describing a frame rate of an image of a card holder and a frame rate of a unique pattern displayed at an electronic identification card including a display device in accordance with example embodiments.

Referring to FIGS. 2 and 4, the display device 100 included in the electronic identification card 200 may display an image of a card holder at a first frame rate (e.g., 60 fps) and may display a unique pattern at a second frame rate (e.g., 1 fps) lower than the first frame rate. Duration of one frame of the unique pattern may be so short that a person may not sense the unique pattern. In some example embodiments, the duration of one frame of the unique pattern may be the same as duration of one frame of the image of the card holder, and the duration of one frame of the unique pattern may be about 1/60 second in a case where the first frame rate is about 60 fps. In other example embodiments, the duration of one frame of the unique pattern may be different from the duration of one frame of the image of the card holder.

In some example embodiments, the display device 100 included in the electronic identification card 200 may display a frame 402 of the unique pattern instead of a frame 401 of the image of the card holder at the second frame rate, so that the unique pattern may be displayed at the second frame rate. For example, in a case where the first frame rate for the image of the card holder is about 60 fps, and the second frame rate for the unique pattern is about 1 fps, the display device 100 may display the frame 402 of the unique pattern once per second instead of the frame 401 of the image of the card holder. In other example embodiments, the display device 100 included in the electronic identification card 200 may display the image of the card holder in a visible wavelength region, and may also display the unique pattern in an invisible wavelength region (e.g., in a infrared light region or in a ultraviolet light region).

In some example embodiments, the display device 100 included in the electronic identification card 200 may start to periodically display the unique pattern in response to a predetermined command. For example, the display device 100 may display only the image of the card holder until the predetermined command is received, and may display the unique pattern instead of or along with the image of the card holder in response to the predetermined command. The predetermined command may include information about a frame rate for displaying the unique pattern, and the display device 100 may display the unique pattern at the frame rate indicated by the predetermined command. The display device 100 may change the frame rate for displaying the unique pattern according to the information included in the predetermined command, thereby further preventing counterfeit/alteration of the electronic identification card 200. In other example embodiments, the display device 100 included in the electronic identification card 200 may periodically display the unique pattern without receiving the predetermined command.

FIGS. 5A through 5C are diagrams illustrating examples of a display panel included in a display device in accordance with example embodiments.

Referring to FIG. 5A, a display panel 110a may include a plurality of visible pixels VP arranged in a matrix form. For, example, each visible pixel VP may be an RGB pixel including a red sub-pixel emitting red light, a green sub-pixel emitting green light, and a blue sub-pixel emitting blue light; a WOLED pixel including white sub-pixels emitting visible light and red, green, and blue filters formed on the white sub-pixels; an RGBW pixel including white sub-pixels on which the red, green, and blue filters are formed, and a white sub-pixel on which a color filter is not formed. In this case, the display panel 110a may display an image of a card holder and a unique pattern in a visible wavelength region.

Referring to FIG. 5B, the display panel 110b may include a plurality of visible pixels VP and a plurality of invisible pixels NVP. The plurality of visible pixels VP may emit the visible light (e.g., red light, green light, blue light, and/or white light), and the plurality of invisible pixels NVP may emit invisible light (e.g., infrared light or ultraviolet light). An organic light emitting diode included in each invisible pixel NVP may include a material emitting the infrared light, such as gallium arsenide (GaAs), indium phosphide (InP), indium arsenide (InAs), gallium arsenide phosphide (GaAsP), etc., or a material emitting the ultraviolet light, such as aluminum gallium nitride (AlGaN), aluminum nitride (AlN), etc.

The display panel 110b may display an image of a card holder in a visible wavelength region by using the plurality of visible pixels VP and may display a unique pattern in an invisible wavelength region by using the plurality of invisible pixels NVP. In some example embodiments, the unique pattern need not to have high image quality, and a resolution of the plurality of invisible pixels NVP may be lower than a resolution of the plurality of visible pixels VP.

Referring to FIG. 5C, a display panel 110c may include a plurality of visible pixels VP and a plurality of visible and invisible pixels V+NVP. A portion, i.e., a subset of pixels V+NVP that may be arranged in a matrix of non-adjacent pixels, of the pixels VP and V+NVP arranged in a matrix may include a material emitting invisible light as well as a material emitting visible light to emit the invisible light as well as visible light. The display panel 110c may display an image of a card holder in a visible wavelength region by using the plurality of visible pixels VP and the plurality of visible and invisible pixels V+NVP, and may display a unique pattern in an invisible wavelength region using the subset of visible and invisible pixels V+NVP.

Figure 6:
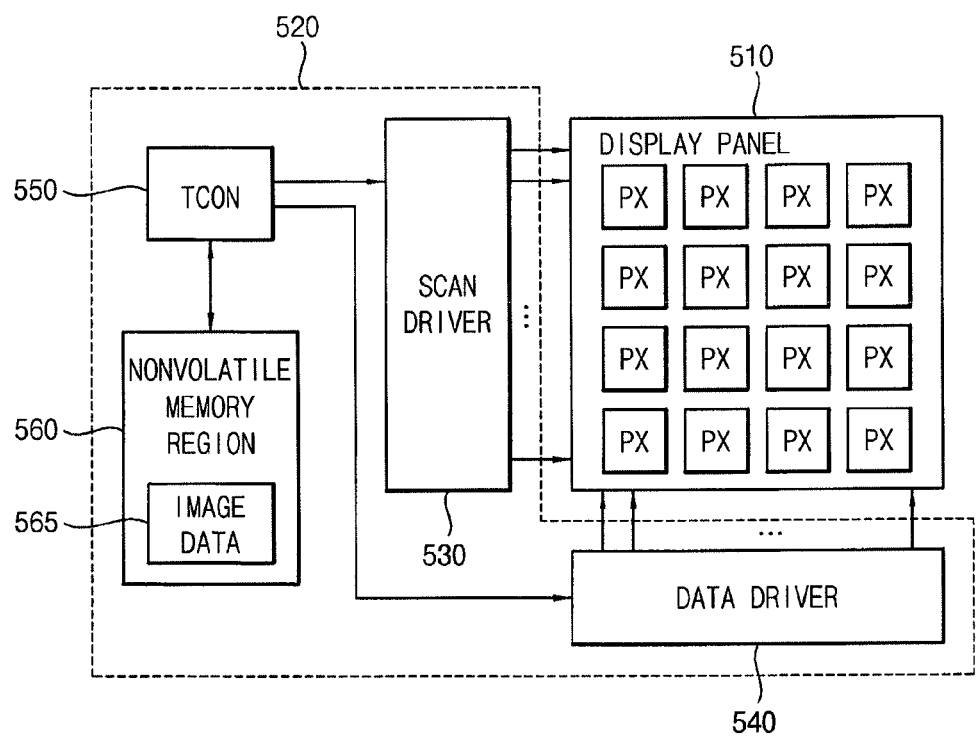
FIG. 6 is a block diagram illustrating a display device included in an electronic identification card in accordance with example embodiments.

FIG. 6 is a block diagram illustrating a display device included in an electronic identification card in accordance with example embodiments. Referring to FIG. 6, a display device 500 included in an electronic identification card includes a display panel 510 and a display driver 520.

The display panel 510 may include a plurality of pixels PX arranged in a matrix form. A portion of the plurality of pixels PX may emit invisible light, and positions of the portion of the plurality of pixels may correspond to a unique pattern that is unique to the electronic identification card. That is, when the display panel 510 is manufactured, the plurality of pixels PX may be formed such that the pixels PX emitting the invisible light may have different positions with respect to different electronic identification cards. In some example embodiments, the portion of the plurality of pixels PX emitting the invisible light may include a material emitting the invisible light. In other example embodiments, all of the plurality of pixels PX may include the material emitting the invisible light, and the plurality of pixels PX except the portion of the plurality of pixels PX may include filters blocking the invisible light. According to example embodiments, the invisible light emitted by the pixels having positions corresponding to the unique pattern may be infrared light or ultraviolet light.

The display driver 520 may include a scan driver 530, a data driver 540, a timing controller 550, and a memory region 560. The scan driver 530 may be controlled by the timing controller 550 to turn on or off TFTs formed on the display panel 510. The data driver 540 may be controlled by the timing controller 550 to apply a data signal corresponding to an image to be displayed to the display panel 510. The memory region 560 may store image data 565 about a card holder of the electronic identification card. For example, the memory region 560 may be implemented with a nonvolatile memory. The timing controller 550 may control the data driver 540 and the scan driver 530 to display an image of the card holder by the display panel 510 based on the image data 565 stored in the memory region 560.

As described above, the pixels having the positions corresponding to the unique pattern may emit the invisible light, and thus the display device 500 included in the electronic identification card according to example embodiments may display the unique pattern that is unique to the electronic identification card in an invisible wavelength region. Thus, even if the image of the card holder is counterfeited or altered by changing the image data 565 stored in the display device 500 or card holder information on the electronic identification card is counterfeited or altered, the positions of the pixels emitting the invisible light cannot be changed. Accordingly, whether the electronic identification card is counterfeited or altered may be checked using the unique pattern that is unique to the electronic identification card.

Figure 7:
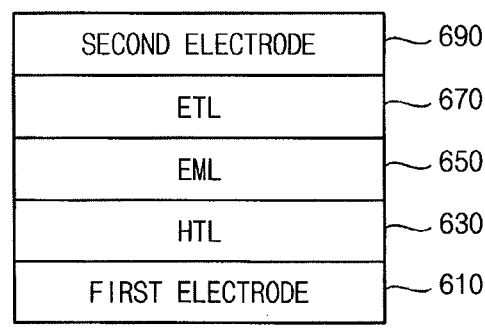
FIG. 7 is a diagram illustrating an example of an organic light emitting diode included in a display device in accordance with example embodiments.

FIG. 7 is a diagram illustrating an example of an organic light emitting diode 600 included in a display device in accordance with example embodiments.

Referring to FIG. 7, the organic light emitting diode 600 may include a first electrode 610 and a second electrode 690, and may further include a hole transport layer (HTL) 630, an emissive layer (EML) 650 and an electron transport layer (ETL) 670 sequentially disposed between the first and second electrodes 610 and 690. According to example embodiments, the organic light emitting diode 600 may further include a hole injecting layer (HIL), an electron injecting layer (EIL), etc.

The first electrode 610 may correspond to an anode providing holes to the HTL 630, and the second electrode 690 may correspond to a cathode providing electrons to the ETL 670. The EML 650 may include a host material and a fluorescent or phosphorescent dopant material. In the EML 650, energy is generated by a fluorescent mechanism or a phosphorescent mechanism, and light having a wavelength corresponding to the energy may be generated.

In some example embodiments, organic light emitting diodes 600 included in pixels having positions corresponding to a unique pattern among a plurality of pixels PX illustrated in FIG. 6 may include a material emitting invisible light. For example, the material emitting the invisible light may be deposited on the EMLs 650 of the organic light emitting diodes 600 included in the pixels having the positions corresponding to the unique pattern. In some example embodiments, the EMLs 650 of the organic light emitting diodes 600 included in the pixels having the positions corresponding to the unique pattern may include a material emitting infrared light, such as GaAs, InP, InAs, GaAsP, etc., and thus the pixels having the positions corresponding to the unique pattern may emit the infrared light. In other example embodiments, the EMLs 650 of the organic light emitting diodes 600 included in the pixels having the positions corresponding to the unique pattern may include a material emitting ultraviolet light, such as AlGaN, AlN, etc., and thus the pixels having the positions corresponding to the unique pattern may emit the ultraviolet light.

In other example embodiments, all of the plurality of pixels PX illustrated in FIG. 6 may include the material emitting the invisible light, and the plurality of pixels PX except the pixels having the positions corresponding to the unique pattern may include filters blocking the invisible light.

As described above, in a display device included in an electronic identification card according to example embodiments, the organic light emitting diodes 600 included in the pixels having the positions corresponding to the unique pattern may include the material emitting the invisible light, or the plurality of pixels except the pixels having the positions corresponding to the unique pattern may include the filters blocking the invisible light. Accordingly, the display device included in the electronic identification card according to example embodiments may display the unique pattern that is unique to the electronic identification card in an invisible wavelength region.

Figure 8:
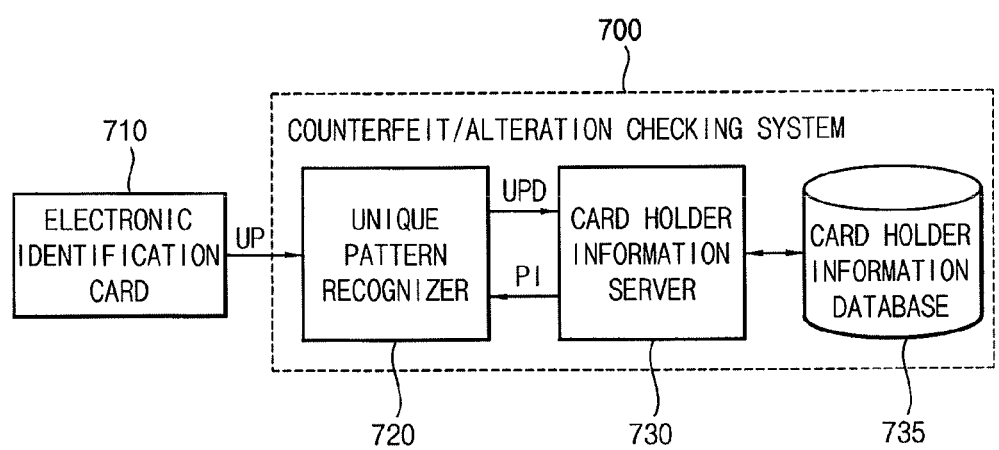
FIG. 8 is a diagram illustrating a counterfeit/alteration checking system in accordance with example embodiments.

FIG. 8 is a diagram illustrating a counterfeit/alteration checking system in accordance with example embodiments. FIG. 9 is a flow chart illustrating a method of checking counterfeit/alteration of an electronic identification card in accordance with example embodiments.

Referring to FIG. 8, a counterfeit/alteration checking system 700 may include a unique pattern recognizer 720 recognizing a unique pattern UP displayed by an electronic identification card 710, a card holder information database 735 storing card holder information PI, and a card holder information server 730 providing the card holder information PI stored in the card holder information database 735 in response to unique pattern data UPD received from the unique pattern recognizer 720.

Referring to FIGS. 8 and 9, a display device included in the electronic identification card 710 may display the unique pattern UP that is unique to the electronic identification card 710. In some example embodiments, the display device included in the electronic identification card 710 may display the unique pattern UP based on unique pattern data stored in a one-time programmable memory region as illustrated in FIG. 1. In this case, the display device may periodically display the unique pattern UP, or may display the unique pattern UP in response to a predetermined command received from the unique pattern recognizer 720. In other example embodiments, pixels emitting invisible light may formed at positions corresponding to the unique pattern UP in the display device included in the electronic identification card 710 as illustrated in FIG. 6, and thus the display device may display the unique pattern UP using the pixels emitting the invisible light.

The counterfeit/alteration checking system 700 may obtain first card holder information PI corresponding to the unique pattern UP by recognizing the unique pattern UP displayed by the display device (S820). For example, the unique pattern recognizer 720 may recognize the unique pattern UP displayed in a form of a barcode, a QR code, a color code, etc. or in a form of a hologram to generate the unique pattern data UPD, and may provide the unique pattern data UPD to the card holder information server 730. The card holder information server 730 may search the first card holder information PI stored in the card holder information database 735 by using the unique pattern data UPD as a key value, and may provide the searched first card holder information PI to the unique pattern recognizer 720. The unique pattern recognizer 720 may display the first card holder information PI provided from the card holder information server 730 on a screen. The first card holder information PI may be stored in the card holder information database 735 when the electronic identification card 710 is issued. For example, in case of an electronic passport as illustrated in FIG. 2, the first card holder information PI may include an image of a card holder, a type of a passport, a passport number, a surname of the card holder, a given name of the card holder, a nationality of the card holder, a date of birth of the card holder, a sex of the card holder, etc.

To check whether the electronic identification card 710 is counterfeited or altered, the first card holder information PI stored in the card holder information database 735 when the electronic identification card 710 is issued may be compared with second card holder information on the electronic identification card 710 (S830). For example, the image of the card holder that is stored in the card holder information database 735 and displayed on the screen of the unique pattern recognizer 720 may be compared with an image of the card holder displayed by the display device included in the electronic identification card 710 to check whether the image of the card holder of the electronic identification card 710 is counterfeited or altered. Further, a type of a passport, a passport number, a surname of the card holder, a given name of the card holder, nationality of the card holder, a date of birth of the card holder, sex of the card holder, etc., displayed on the screen of the unique pattern recognizer 720 may be compared with a type of a passport, a passport number, a surname of the card holder, a given name of the card holder, a nationality of the card holder, a date of birth of the card holder, a sex of the card holder, etc. recorded (e.g., printed) on the electronic identification card 710.

If the first card holder information PI is the same as the second card holder information (S840: YES), it is determined that the electronic identification card 710 is neither counterfeited nor altered (S850). If the first card holder information PI is different from the second card holder information (S840: NO), it is determined that the electronic identification card 710 is counterfeited or altered (S860).

As described above, the display device of the electronic identification card 710 may display the unique pattern UP, and the counterfeit/alteration checking system 700 may obtain the card holder information PI that is stored when the electronic identification card 710 is issued by recognizing the unique pattern UP. Accordingly, the card holder information PI stored when the electronic identification card 710 is issued may be compared with the card holder information currently shown on the electronic identification card 710, and thus counterfeit/alteration of the electronic identification card 710 can be checked.

The inventive concept may be applied to any electronic identification card including a display device, such as an electronic passport, an electronic resident card, an electronic driver's license card, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. An electronic identification card including a display device, the display device comprising:
   a first memory region configured to store image data about a card holder including an image of the card holder of the electronic identification card;
   a second memory region configured to store unique pattern data about a unique pattern that is unique to the electronic identification card; and
   a display panel configured to display the image of the card holder based on the image data stored in the first memory region and to display the unique pattern based on the unique pattern data stored in the second memory region.

2. The electronic identification card of claim 1, wherein the second memory region includes a one-time programmable (OTP) memory region.

3. The electronic identification card of claim 1, wherein the unique pattern includes a quick response (QR) code, a bar code, or a color code.

4. The electronic identification card of claim 1, wherein a frame rate for displaying the unique pattern is different from a frame rate for displaying the image of the card holder.

5. The electronic identification card of claim 1, wherein the display device is configured to display the unique pattern in response to a predetermined command.

6. The electronic identification card of claim 5, wherein:
   the predetermined command includes information about a frame rate for displaying the unique pattern, and
   the display device is configured to display the unique pattern at the frame rate indicated by the predetermined command.

7. The electronic identification card of claim 1, wherein:
   the display panel is configured to display the image of the card holder in a visible wavelength region, and
   the display panel is configured to display the unique pattern in an invisible wavelength region.

8. The electronic identification card of claim 7, wherein the display panel comprises:
   a plurality of visible pixels for displaying the image of the card holder; and a plurality of invisible pixels for displaying the unique pattern.

9. An electronic identification card including a display device, the display device comprising:
   a plurality of pixels arranged in a matrix,
   wherein at least a subset of the plurality of pixels emit invisible light, and
   wherein positions of pixels in the subset of the plurality of pixels correspond to a unique pattern that is unique to the electronic identification card.

10. The electronic identification card of claim 9, wherein the subset of the plurality of pixels include an organic light emitting diode having a material that emits the invisible light.

11. The electronic identification card of claim 9, wherein the plurality of pixels, except the subset of the plurality of pixels, includes filters blocking the invisible light.

12. The electronic identification card of claim 9, wherein the invisible light emitted by the subset of the plurality of pixels is infrared light.

13. The electronic identification card of claim 9, wherein the invisible light emitted by the subset of the plurality of pixels is ultraviolet light.

14. A method of checking counterfeit/alteration of an electronic identification card including a display device, the method comprising:
   displaying, by the display device, a unique pattern that is unique to the electronic identification card;
   obtaining, by a counterfeit/alteration checking system, first card holder information corresponding to the unique pattern by recognizing the unique pattern displayed by the display device; and
   checking whether the electronic identification card is counterfeited or altered by comparing the first card holder information with second card holder information on the electronic identification card, wherein checking whether the electronic identification card is counterfeited or altered includes:
   determining that the electronic identification card is neither counterfeited nor altered when the first card holder information is equal to the second card holder information; and
   determining that the electronic identification card is counterfeited or altered when the first card holder information is different from the second card holder information.

15. The method of claim 14, wherein the unique pattern is displayed based on unique pattern data stored in a one-time programmable (OTP) memory region of the display device.

16. The method of claim 14, wherein displaying the unique pattern comprises:
   receiving, by the display device, a predetermined command from the counterfeit/alteration checking system; and
   displaying, by the display device, the unique pattern in response to the predetermined command.

17. The method of claim 16, wherein the predetermined command includes information about a frame rate for displaying the unique pattern, and wherein the display device is configured to display the unique pattern at the frame rate included in the predetermined command.

18. The method of claim 14, wherein the unique pattern is displayed such that pixels having positions corresponding to the unique pattern emit invisible light.

19. The method of claim 18, wherein the pixels having the positions corresponding to the unique pattern include an organic light emitting diode having a material that emits the invisible light.

* * * * *